United States Patent
Wittekind et al.

[15] 3,666,767
[45] May 30, 1972

[54] 2-AMINO-1-(2-IMIDAZOLIN-2-YL)-2-IMIDAZOLINES

[72] Inventors: Raymond R. Wittekind, Morristown; John Shavel, Jr., Mendham, both of N.J.

[73] Assignee: Warner-Lambert Company, Morris Plains, N.J.

[22] Filed: Jan. 28, 1970

[21] Appl. No.: 6,639

[52] U.S. Cl. ...............260/296 R, 260/247.5 R, 260/293.7, 260/309.6, 424/263, 424/267, 424/273
[51] Int. Cl. .......................................C07d 31/42
[58] Field of Search ................................260/296 R

[56] References Cited

UNITED STATES PATENTS 3,359,274  12/1967  Billinghurst..........................260/296

*Primary Examiner*—Alan L. Rotman
*Attorney*—Albert H. Graddis, Henry E. Millson, Jr., Frank S. Chow, Neil D. Edwards and Anne M. Kelly

[57] ABSTRACT

The present invention relates to 2-amino-1-(2-imidazolin-2-yl)-2-imidazolines, the free base of which has the following structural formulas:

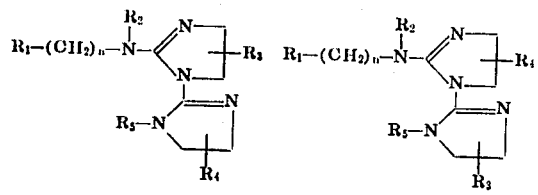

wherein
$R_1$ is hydrogen, lower alkyl, cycloalkyl, aryl, substituted aryl, heterocyclic, substituted heterocyclic or aryloxy;
$R_2$ is hydrogen, lower alkyl, aryl and substituted aryl;
or $R_1$ and $R_2$ taken together with the nitrogen atom to which they are attached from a heterocyclic ring;
$R_3$ and $R_4$ are hydrogen, lower alkyl, aryl, or substituted aryl;
$R_5$ is hydrogen, lower alkyl, aryl or substituted aryl;
$n$ is an integer from 0 to 10.

The compounds of this invention are useful as antiarrhythmic agents as well as antibacterial agents.

3 Claims, No Drawings

2-AMINO-1-(2-IMIDAZOLIN-2-YL)-2-IMIDAZOLINES

The present invention relates to 2-amino-1-(2-imidazolin-2-yl)-2-imidazolines having the following structural formulas:

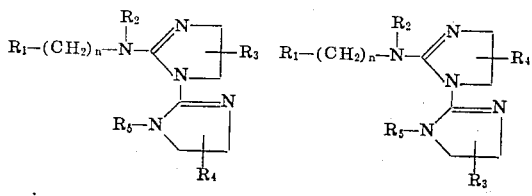

wherein
$R_1$ is hydrogen, lower alkyl, cycloalkyl, heterocyclic, substituted heterocyclic; aryl, substituted aryl, or aryloxy;
$R_2$ is hydrogen, lower alkyl, aryl, substituted aryl,
or $R_1$ and $R_2$ taken together with the nitrogen atom to which they are attached form a heterocyclic ring, for example a 5- or 6-membered ring;
$R_3$ and $R_4$ are hydrogen, lower alkyl, aryl or substituted aryl;
$R_5$ is hydrogen, lower alkyl, aryl or substituted aryl;
$n$ is an integer from 0 to 10.

In the definitions for $R_1$, $R_2$, $R_3$, $R_4$, and $R_5$, the term "lower alkyl" includes lower aliphatic hydrocarbons having one to 10 carbon atoms in the carbon chain. It includes straight chain as well as branched chain radicals. The term also includes, for example, methyl, ethyl, propyl, isopropyl, butyl, isobutyl and the like. The term "cycloalkyl" encompasses saturated monocyclic groups having from three to eight carbon atoms, such as cyclopropyl, cyclobutyl, cyclopentyl, cyclohexyl, cycloheptyl, and cyclooctyl. The term "heterocyclic" encompasses the monocyclic 5- and 6-membered hetero rings having at least one hetero atom in the ring which may be either nitrogen, oxygen or sulfur. Representative heterocyclics falling within this definition are, for example, aziridinyl, azetedinyl, pyrrolyl, pyrrolidinyl, morpholino, thienyl, furyl, pyridyl, piperidyl, indolyl, and the like. Additionally, these 5- and 6-membered heterocyclics may have further substituents in their ring portions by groups such as, hydrogen, halogen, lower alkyl and lower alkoxy. The term "aryl" denotes a monocyclic or bicyclic hydrocarbon radical, preferably of six to 10 carbon atoms, such as for example, phenyl, naphthyl and the like. The term "substituted aryl" as used herein includes aryl as defined above in which one or more of the hydrogen atoms of the aryl portion have been substituted by groups such as, halogen, hydroxyl, lower alkyl, trifluoromethyl, amino, substituted amino or lower alkoxy. X, in the formulas below, includes anions such as the halides, for example, fluoride, chloride, iodide, bromide, or other anions such as, sulfate, nitrate, phosphate, maleate, fumarate and the like.

The definitions for $R_1$, $R_2$, $R_3$, $R_4$ and $R_5$, and $n$ as used hereinafter have the same meanings as defined above.

The compounds of this invention exhibit antiarrhythmic activity, for example, at a dosage of about 2 to 3 mg/kg, body weight in a mammal such as, cats, dogs, monkeys, and the like. In experimentally induced arrhythmia, such as those induced by ouabain, at a dosage of 2 to 3 mg/kg, the compounds of this invention are capable of arresting such arrhythmia. Generally speaking, the compounds of this invention are useful in conditions associated with cardiac arrhythmia. A dosage level of about 1 to 10 mg, several times daily is recommended. This dosage regimen can be varied according to body weight, sex, species of the mammal being treated.

Among the dosage forms which can be used to administer these compounds are, for example, tablets, powders, elixirs, suspensions and the like. These dosage forms are formulated by procedures known to the pharmacist's art.

All the compounds of this invention also exhibit antibacterial activity against gram positive cocci, such as *Staphylococcus aureus* or gram negative bacilli, such as *E. coli*. To use the compounds as antibacterials, they are formulated from 1 to 10 percent by weight with a dermatologically acceptable vehicle, such as talc, petrolatum and applied liberally to the site infected with the susceptible bacteria.

According to the processes of this invention, the above compounds can be prepared by methods depicted as follows:

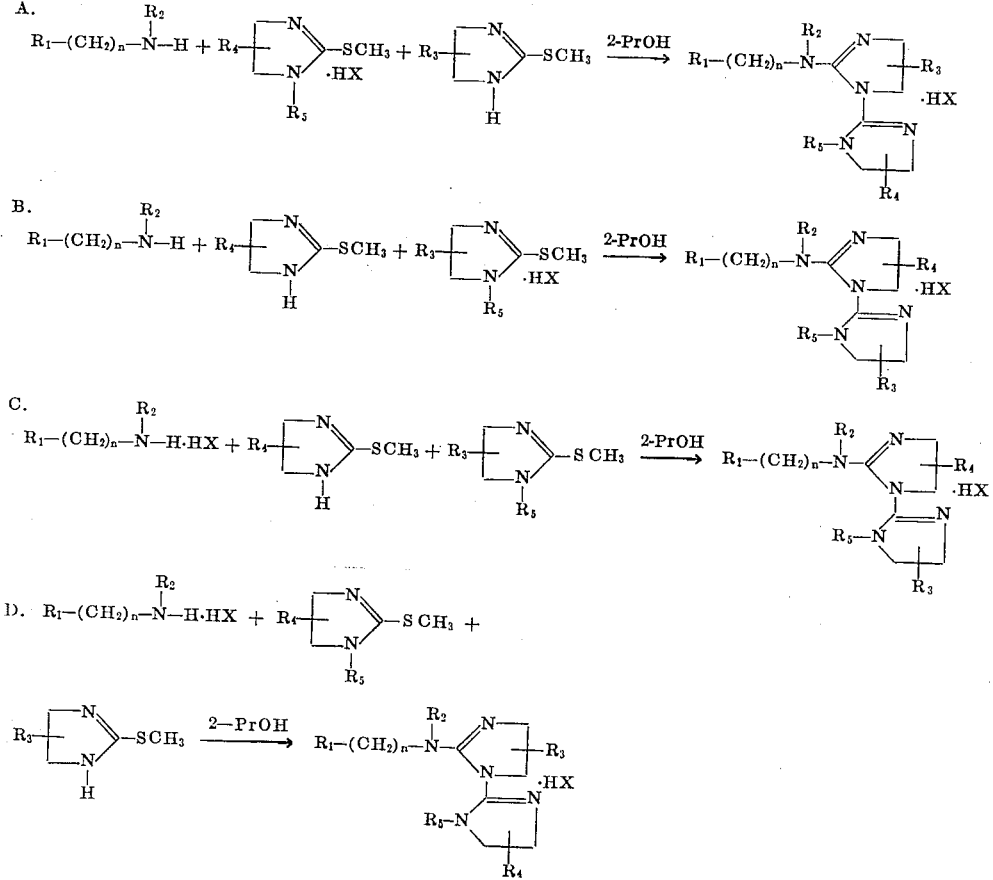

E. 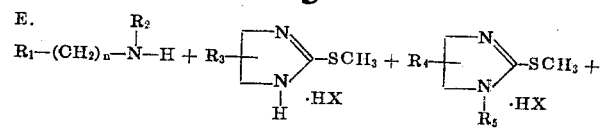

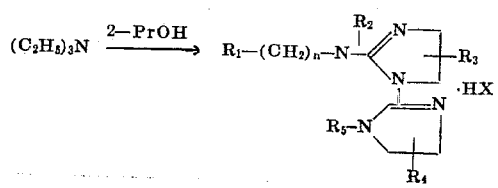

F. 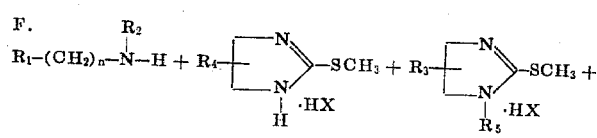

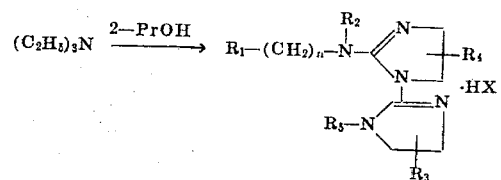

G. 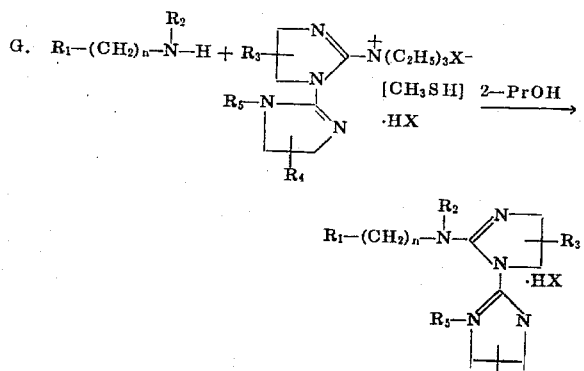

H. 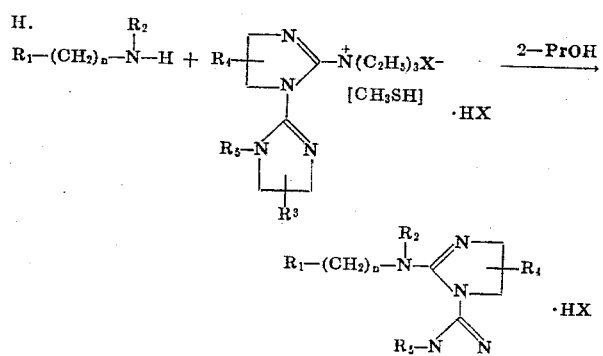

I. 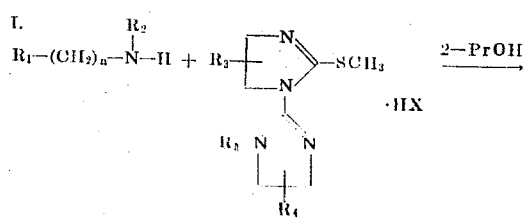

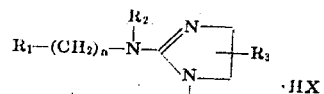

J. 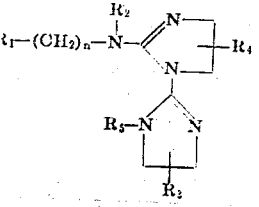

In the above, X is an anion, such as the halides, for example, fluoride, chloride, iodide, bromide, or other anions such as, sulfate, nitrate, phosphate, maleate, fumarate and the like.

Generally speaking, in the above process identified as A to J, the starting materials are allowed to react together with 2-propanol, preferably under reflux conditions and in the absence of atmospheric air. The resulting compounds are recovered from the reaction mixtures either in the form of free base or in the form of the HX salt by methods well known to the art, such as for example, recrystallization techniques.

The free base of this invention can be converted to its corresponding pharmaceutically acceptable acid addition salts. Exemplary of nontoxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques.

In the above reaction diagrams (A to J), starting amines are known compounds and are commercially available from sources such as Aldrich Chemical Company and they can also be prepared by known methods such as those outlined in Synthetic Organic Chemistry by R. B. Wagner and H. D. Zook, John Wiley & Sons, Inc., New York, New York 1953, p. 653.

The 2-methylmercaptoimidazol-2-ines starting compounds are prepared according to procedures such as those outlined in S. R. Aspinall and E. J. Bianco, J. Org. Chem., 73, 602 (1951), W. Wilson, J. Chem. Soc. 1389 (1955), A. L. Langis and F. Herr, Can. 736,494 (June 14, 1966), C. A. 65, 12212 (1966). The starting triethyl[1-(2-imidazolin-2-yl)-2-imidazolin-2-yl]ammonium iodide hydroiodide methanethiol and 1-(2-imidazolin-2-yl)-2-(methylthio)-2-imidazoline hydroiodide are prepared by the following reaction schemes:

K. 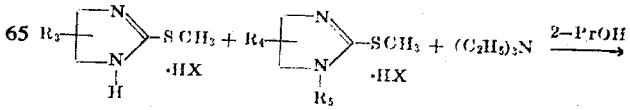

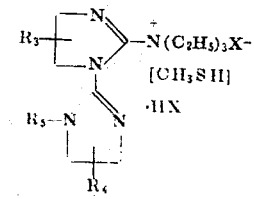

L.

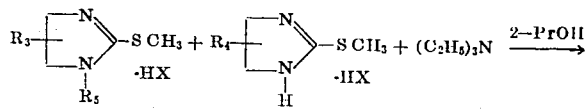

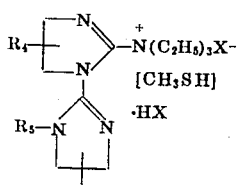

M.

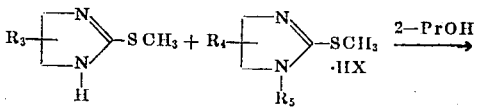

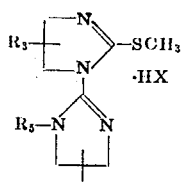

N.

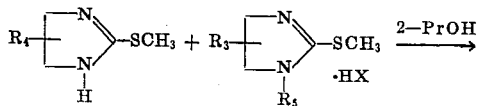

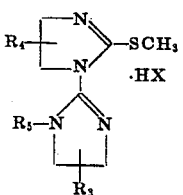

The following examples are included in order further to illustrate the invention.

EXAMPLE 1

2-[(3,4-Dimethoxyphenethyl)amino]-1-(2-imidazolin-2-yl)-2-imidazoline hydroiodide A solution of 3,4-dimethoxyphenethylamine (1.81 g, 0.0100 mol), 2-methylmercaptoimidazol-2-ine hydroiodide (4.88 g, 0.0200 mol), triethylamine (1.01 g, 0.0100 mol), and freshly distilled (from calcium hydride) 2-propanol (50 ml) was heated under reflux for 1 hour while a slow stream of nitrogen was passed through the reaction mixture. The reaction mixture was allowed to cool to room temperature. The solid was collected and recrystallized from 95 percent 2-propanol-water; yield, 0.90 g (24 percent) of the imidazoline hydroiodide, mp 199.0°–201.0° C.

Anal. for $C_{16}H_{24}IN_5O_2$:
| | C | H | I | N |
|---|---|---|---|---|
| Calcd: | C 43.16 | H 5.43 | I 28.50 | N 15.73 |
| Found: | C 43.45 | H 5.45 | I 28.63 | N 15.43 |

EXAMPLE 2

2-[(Cyclopropylmethyl)amino]-1-(2-imidazolin-2-yl)-2-imidazoline hydroiodide

A solution of cyclopropylmethylamine (1.43 g, 0.0200 mol), triethyl [1-(2-imidazolin-2-yl)-2-imidazolin-2-yl] ammonium iodide hydroiodide methanethiol (9.86 g, 0.0182 mol) and freshly distilled (from calcium hydride) 2-propanol (30 ml) was heated under reflux for 1 hour and allowed to cool to room temperature. The solid was collected and recrystallized from 90 percent 2-propanol-water; yield 2.7 g (35 percent) of the imidazoline hydroiodide, mp 238.0°–239.0° C. dec.

Anal. for $C_{10}H_{18}IN_5$:
| | C | H | I | N |
|---|---|---|---|---|
| Calcd: | C 35.82 | H 5.37 | I 37.92 | N 20.90 |
| Found: | C 35.72 | H 5.40 | I 37.87 | N 20.84 |

EXAMPLE 3

1-(2-{[1(2-Imidazolin-2-yl)-2-imidazolin-2-yl]amino}ethyl)indole hydroiodide

A solution of 1-(2-aminoethyl)-indole (3.24 g, 0.0200 mol), triethyl [1-(2-imidazolin-2-yl)-2-imidazolin-2-yl] ammonium iodide hydroiodide methanethiol (9.87 g, 0.0182 mol) and redistilled (from calcium hydride) 2-propanol (50 ml) was heated under reflux for 30 minutes and allowed to cool to room temperature. The solid was collected. Recrystallization from 90 percent 2-propanol-water afforded 3.60 g (42.0 percent) of the imidazoline hydroiodide, mp 228.0°–229.0° C. dec.

Anal. for $C_{16}H_{21}IN_6$:
| | C | H | I | N |
|---|---|---|---|---|
| Calcd: | C 45.29 | H 4.99 | I 29.91 | N 19.81 |
| Found: | C 45.38 | H 5.00 | I 29.70 | N 19.60 |

EXAMPLE 4

3-(2-{[1-2-(Imidazolin-2-yl)-2-imidazolin-2-yl]amino}ethyl)indole hydroiodide.

A solution of tryptamine (6.40 g, 0.0400 mol), 2-methylmercaptoimidazol-2-ine hydroiodide (19.5 g, 0.0800 mol), triethylamine (4.05 g, 0.0400 mol) and 2-propanol (freshly distilled from calcium hydride, 35 ml) was heated under reflux for 2 hours and then allowed to cool to room temperature. The solid was collected and recrystallized from 90 percent 2-propanol-water; yield 3.39 g (20.0 percent) of the imidazoline hydroiodide, mp 256.0°–257.0° C. dec.

Anal. for $C_{16}H_{21}IN_6$:
| | C | H | I | N |
|---|---|---|---|---|
| Calcd: | C 45.29 | H 4.99 | I 29.91 | N 19.81 |
| Found: | C 45.43 | H 4.98 | I 30.03 | N 19.97 |

EXAMPLE 5

3-(2-{[1-(2-Imidazolin-2-yl)-2-imidazolin-2-yl]amino}ethyl)-5-methoxyindole hydroiodide A solution of 5-methoxyindole (5.70 g, 0.0300 mol), 2-mercaptomethylimidazol-2-ine hydroiodide (14.6 g, 0.0600 mol), triethylamine (3.04 g, 0.0300 mol) and freshly distilled (from calcium hydride) 2-propanol (30 ml) was heated under reflux for 2 hours and allowed to cool to room temperature. The precipitate was collected and recrystallized from 80 percent ethanol-water; yield 2.50 g (20.0 percent) of the imidazoline hydroiodide, mp 270.0°–271.0° C. dec.

Anal. for $C_{17}H_{23}IN_6O$:
| | C | H | I | N | O |
|---|---|---|---|---|---|
| Calcd: | C 44.94 | H 5.10 | I 27.93 | N 18.50 | O 3.52 |
| Found: | C 45.00 | H 5.06 | I 28.11 | N 18.55 | O 3.79 |

EXAMPLE 6

2-[(4-Chlorophenethyl)amino]-1-(2-imidazolin-2-yl)-2-imidazoline hydroiodide

A solution of 2-(4-chlorophenethyl)amine (3.83 g, 0.0250 mol), triethyl[1-(2-imidazolin-2-yl)-2-imidazolin-2-yl] ammonium iodide hydroiodide methanethiol (12.2 g, 0.0226 mol) and freshly distilled (from calcium hydride) 2-propanol (100 ml) was heated under reflux for 7 minutes and allowed to cool to room temperature. The solid was collected and recrystallized from 95 percent 2-propanol-water; yield 4.83 g (46.0 percent) of the imidazoline hydroiodide, mp 197.0°–199.0° C. dec.

Anal. for $C_{14}H_{19}ClIN_5$:
| | C | H | Cl | I | N |
|---|---|---|---|---|---|
| Calcd: | C 40.07 | H 4.56 | Cl 8.45 | I 30.24 | N 16.69 |
| Found: | C 40.21 | H 4.65 | Cl 8.65 | I 30.10 | N 16.81 |

EXAMPLE 7

2-[(3,4-Dihydroxyphenethyl)amino]-1-(2-imidazolin-2-yl)-2-imidazoline hydrochloride A solution of 3-hydroxytyramine hydrochloride (5.69 g, 0.0300 mol), 2-methylmercaptoimidazol-2-ine (6.96 g, 0.0600 mol) and 2-propanol (distilled from calcium hydride, 100 ml) was heated under reflux for 1 hour while a stream of nitrogen was slowly bubbled through the solution. The reaction mixture was allowed to cool to room temperature. The solid was collected and recrystallized from 95 percent 2-propanol-water; yield 2.37 g (27.0 percent) of the imidazoline, mp 233.0°–234.0° C. dec.

Anal. for $C_{14}H_{20}ClN_5O_2$:
| | | | | |
|---|---|---|---|---|
| Calcd: | C 51.61 | H 6.19 | Cl 10.88 | N 21.50 |
| Found: | C 51.53 | H 6.18 | Cl 10.86 | N 21.60 |

EXAMPLE 8

1-(2-Imidazolin-2-yl)-2-(methylthio)-2-imidazoline hydroiodide

A solution of 2-methylmercapto-2-imidazoline hydroiodide (14.6 g, 0.0600 mol), 2-methylmercapto-2-imidazoline (6.96 g, 0.0600 mol) and 2-propanol (distilled from calcium hydride, 200 ml) was heated under reflux for 3 hours while a slow stream of nitrogen was bubbled through the reaction mixture. The reaction mixture was allowed to cool. The solid was collected and recrystallized from 95 percent 2-propanol-water; yield 4.06 g (22.0 percent) of the 2-imidazoline, mp 173.0°–175.0° C. and 230.0°–250.0° C. dec.

Anal. for $C_7H_{13}IN_4S$:
| | | | | |
|---|---|---|---|---|
| Calcd: | C 26.93 | H 4.20 | I 40.65 | N 17.95 |
| Found: | C 27.22 | H 4.16 | I 40.79 | N 17.84 |

EXAMPLE 9

1-(2-Imidazolin-2-yl)-2-(3-indol-3-ylpropylamino)-2-imidazoline hydroiodide

A solution of homotryptamine (5.22 g, 0.0300 mol), 2-methylmercapto-2-imidazoline (3.48 g, 0.0300 mol), 2-methylmercapto-2-imidazoline hydroiodide (7.32 g, 0.0300 mol), and 2-propanol (distilled from calcium hydride, 70 ml) was heated under reflux for 1 ½ hours while a stream of nitrogen was bubbled through the reaction mixture. The solution was allowed to cool to room temperature. The solvent was evaporated. Trituration of the residual oil with 2-propanol (100 ml) followed by recrystallization from 95 percent 2-propanol-water afforded 1.95 g (15.0 percent) of the imidazoline, mp 160.0°–162.0° C.

Anal. for $C_{17}H_{23}IN_6$:
| | | | | |
|---|---|---|---|---|
| Calcd: | C 46.58 | H 5.29 | I 28.95 | N 19.17 |
| Found: | C 46.84 | H 5.33 | I 28.85 | N 19.39 |

EXAMPLE 10

1-(2-Imidazolin-2-yl)-2-(2-indanylamino)-2-imidazoline hydrochloride

A solution of 2-aminoindan hydrochloride (13.6 g, 0.0800 mol), 2-methylmercaptoimidazol-2-ine (18.7 g, 0.160 mol) and 2-propanol (distilled from calcium hydride, 120 ml) was heated under reflux for 1 hour while a stream of nitrogen was bubbled through the reaction mixture. The solution was allowed to cool to room temperature. The solid was collected and recrystallized from 95 percent 2-propanol-water; yield 4.6 g (19 percent) of the imidazoline, mp 248.0°–249.0° C.

Anal. for $C_{19}H_{18}ClN_5$:
| | | | | |
|---|---|---|---|---|
| Calcd: | C 58.91 | H 6.59 | Cl 11.59 | N 22.90 |
| Found: | C 58.64 | H 6.81 | Cl 11.29 | N 22.94 |

EXAMPLE 11

2-Anilino-1-(2-imidazolin-2-yl)-2-imidazoline

A solution of freshly distilled aniline (9.3 g, 0.10 mol), 2-methylmercaptoimidazol-2-ine hydroiodide (24.4 g, 0.100 mol), 2-methylmercaptoimidazol-2-ine (11.6 g, 0.100 mol) and 2-propanol (distilled from calcium hydride, 100 ml) was heated under reflux for 3 hours while a slow stream of nitrogen was bubbled through the solution. The reaction mixture was concentrated. The residue was treated with 20 percent sodium hydroxide solution and extracted with methylene chloride (5 × 125 ml-portions). The organic extracts were washed with water, dried over anhydrous sodium sulfate, filtered and evaporated under reduced pressure. The amorphous residual solid was extracted with boiling ether (4 × 750 ml-portions). Evaporation of the solvent followed by recrystallization of the residue from benzene gave 5.2 g (27 percent) of the imidazoline, mp 175.5°–176.5° C. dec.

Anal. for $C_{12}H_{15}N_5$:
| | | | |
|---|---|---|---|
| Calcd: | C 62.86 | H 6.60 | N 30.55 |
| Found: | C 63.13 | H 6.67 | N 30.43 |

EXAMPLE 12

Triethyl[1-(2-imidazolin-2-yl)-2-imidazolin-2-yl]ammonium iodide hydroiodide methanethiol A solution of 2-methylmercaptoimidazol-2-ine hydroiodide (48.8 g, 0.200 mol), triethylamine (20.2 g, 0.200 mol) and redistilled (from calcium hydride) 2-propanol (300 ml) was heated under reflux for 2 hours while a stream of nitrogen was slowly passed through the solution. The reaction mixture was allowed to cool to room temperature. The solid was collected and dried; yield, 19.2 g (36.0 percent) of the quaternary salt; mp 168.0°–172.0° C. and 230.0°–240.0° C. dec.

An analytical sample obtained by repeated recrystallizations from 2-propanol had mp 169.0°–172.0° C. and 230.0°–240.0° C. dec.

Anal. for $C_{13}H_{29}I_2N_5S$:
| | | | | | |
|---|---|---|---|---|---|
| Calcd: | C 28.85 | H 5.40 | I 46.89 | N 12.94 | S 5.92 |
| Found: | C 28.98 | H 5.42 | I 46.76 | N 12.79 | S 5.94 |

EXAMPLE 13

1-(2-Imidazolin-2-yl)-2-{[2-(2-pyridyl)ethyl]amino}-2-imidazoline hydroiodide

A solution of 2-(2-aminoethyl)pyridine (3.91 g, 0.0320 mol), 1-(2-imidazolin-2-yl)-2-(methylthio)-2-imidazoline hydroiodide (9.98 g, 0.0320 mol) and freshly distilled (from calcium hydride) 2-propanol (150 ml) was heated under reflux for 3 hours while a slow stream of nitrogen was bubbled through the reaction mixture. The reaction mixture was allowed to cool to room temperature. The resulting solid was collected and recrystallized from 2-propanol (three times); yield 3.77 g (30.6 percent) of the imidazoline; mp 153.0°–154.0° C.

Anal. for $C_{13}H_{14}IN_6$:
| | | | | |
|---|---|---|---|---|
| Calcd: | C 40.43 | H 4.96 | I 32.86 | N 21.76 |
| Found: | C 40.69 | H 5.02 | I 32.99 | N 21.94 |

EXAMPLE 14

4-(2-Aminoethoxy)-3,5-dimethylbenzophenone hydrochloride

A solution of 3,5-dimethyl-4-(2-phthalimidoethoxy)benzophenone (20.0 g, 0.0500 mol), 99 percent hydrazine hydrate (10.3 g, 0.200 mol) and absolute ethanol (1400 ml) was heated under reflux for 27 hours and then evaporated to dryness under reduced pressure. The residue was partitioned between 1N hydrochloric acid (500 ml) and ether (500 ml). The interfacial material was collected and washed with ether. The layers were separated and the organic phase was extracted with 1N hydrochloric acid (2 × 250 ml). The combined aqueous extracts were basified with 50 percent sodium hydroxide solution and extracted with methylene chloride (4 × 250 ml). The combined organic phase was dried over anhydrous sodium sulfate and filtered. Evaporation of the filtrate gave 13.4 g of a yellow oil which was dissolved in anhydrous ether and treated with hydrogen chloride. The solid was collected and recrystallized from acetonitrile and then ethanol-acetonitrile; yield 8.70 g (57.0 percent) of the amine hydrochloride; mp 185.5°–187.0° C. dec.

Anal. for C₁₇H₂₀ClNO₂:
| | | | | | |
|---|---|---|---|---|---|
| Calcd: | C 66.77 | H 6.59 | Cl 11.59 | N 4.58 | O 10.46 |
| Found: | C 66.88 | H 6.60 | Cl 11.75 | N 4.79 | O 10.51 |

EXAMPLE 15

1-(2-Imidazolin-2-yl)-2-(phenethylamino)-2-imidazoline hydroiodide

A solution of 2-phenethylamine (12.1 g, 0.100 mol), 2-methylmercaptoimidazol-2-ine hydroiodide (24.4 g, 0.100 mol), 2-methylmercaptoimidazol-2-ine (11.6 g, 0.100 mol) and freshly distilled (from calcium hydride) 2-propanol (150 ml) was heated under reflux for 3 hours while a slow stream of nitrogen was passed through the solution. The reaction mixture was concentrated to about one-third of its original volume. The solid was collected and recrystallized from 2-propanol; yield 6.81 g (18.0 percent) of the imidazoline; mp 169.5°–170.5° C.

Anal. for C₁₉H₁₅IN₅:
| | | | | |
|---|---|---|---|---|
| Calcd: | C 43.65 | H 5.23 | I 32.94 | N 18.18 |
| Found: | C 43.95 | H 5.26 | I 33.00 | N 18.27 |

EXAMPLE 16

2-(Benzylamino)-1-(2-imidazolin-2-yl)-2-imidazoline hydroiodide

A solution of benzylamine (10.7 g, 0.100 mol), 2-methylmercaptoimidazol-2-ine hydroiodide (24.4 g, 0.100 mol), 2-methylmercaptoimidazol-2-ine (11.6 g, 0.100 mol) and freshly distilled (from calcium hydride) 2-propanol (100 ml) was heated under reflux for 2 hours while a slow stream of nitrogen was passed through the reaction mixture. The solution was concentrated to one-fourth of its original volume and allowed to stand at room temperature for 4 days. 2-Propanol (150 ml) was added and the precipitate was collected. Recrystallization from 2-propanol gave 6.50 g (17.0 percent) of the imidazoline hydroidide; mp 187.0°–189.0° C.

Anal. for C₁₃H₁₈IN₅:
| | | | | |
|---|---|---|---|---|
| Calcd: | C 42.06 | H 4.89 | I 34.19 | N 18.87 |
| Found: | C 42.31 | H 5.01 | I 34.28 | N 19.13 |

EXAMPLE 17

1-(2-Imidazolin-2-yl)-2[(trans-2-phenylcyclopropyl)amino]-2-imidazoline maleate

A solution of trans-2-phenylcyclopropylamine hydrochloride (9.35 g, 0.0550 mol), 2-methylmercaptoimidazol-2-ine (12.8 g, 0.110 mol) and freshly distilled (from calcium hydride) 2-propanol (125 ml) was heated under reflux for 5 hours and then concentrated under reduced pressure. The residue was partitioned between 20 percent potassium hydroxide solution and methylene chloride. The organic extracts were dried over anhydrous sodium sulphate, filtered and evaporated. Trituration of the residue with ether-pentane gave a white powder (5.47 g). A portion of the white powder (4.01 g) was dissolved in 2-propanol (30 ml) and added to a solution of maleic acid (1.73 g) in 2-propanol (30 ml). The precipitate was collected and recrystallized from 2-propanol; yield 4.07 g (15.0 percent) of the imidazoline maleate; mp 190.0°–191.0° C.

Anal. for C₁₉H₂₃N₅O₄:
| | | | | |
|---|---|---|---|---|
| Calcd: | C 59.12 | H 6.01 | N 18.17 | O 16.60 |
| Found: | C 59.04 | H 6.21 | N 18.36 | O 16.60 |

EXAMPLE 18

2-({[1-(2-Imidazolin-2-yl)-2-imidazolin-2-yl]amino}methyl)-pyridine hydroiodide

A solution of 2-aminomethylpyridine (3.61 g, 0.0330 mol), triethyl[1-(2-imidazolin-2-yl)-2-imidazolin-2-yl] ammonium iodide hydroiodide methanethiol (18.0 g, 0.0330 mol) and freshly distilled (from calcium hydride) 2-propanol (110 ml) was heated under reflux for 2 hours while a slow stream of nitrogen was bubbled through the reaction mixture. The precipitate was collected and recrystallized from 90 percent 2-propanol-water; yield 6.05 g (50.0 percent) of the imidazoline hydroiodide; mp 193.0°–194.0° C. dec.

Anal. for C₁₂H₁₇IN₆:
| | | | | |
|---|---|---|---|---|
| Calcd: | C 38.72 | H 4.60 | I 34.09 | N 22.58 |
| Found: | C 38.88 | H 4.68 | I 33.97 | N 22.57 |

EXAMPLE 19

2-{[2-(4-Benzoyl-2,6-dimethylphenoxy)ethyl]amino}-1-(2-imidazolin-2-yl)-2-imidazoline hydrochloride A solution of 4-(2-aminoethoxy)-3,5-dimethylbenzophenone hydrochloride (6.12 g, 0.0200 mol), 2-methylmercaptoimidazol-2-ine (4.64 g, 0.0400 mol) and freshly distilled (from calcium hydride) 2-propanol (50 ml) was heated under reflux for 22 hours while a slow stream of nitrogen was bubbled through the reaction mixture. Ether was added to the reaction mixture at room temperature. The solid was collected and washed with cold ether-2-propanol. Recrystallization from 2-propanol afforded 1.30 g (15.0 percent) of the imidazoline hydrochloride, mp 213.0°–214.5° C. dec.

Anal. for C₂₃H₂₈ClN₅O₂:
| | | | | | |
|---|---|---|---|---|---|
| Calcd: | C 62.51 | H 6.39 | Cl 18.02 | N 15.85 | O 7.24 |
| Found: | C 62.37 | H 6.53 | Cl 17.77 | N 16.16 | O 7.50 |

EXAMPLE 20

2-(n-Decylamino)-1-(2-imidazolin-2-yl)-2-imidazoline hydroiodide

A solution of n-decylamine (6.61 g, 0.0423 mol), 1-(2-imidazolin-2-yl)-2-(methylthio)-2-imidazoline hydroiodide (13.1 g, 0.0420 mol) and freshly distilled (from calcium hydride) 2-propanol (55 ml) was heated under reflux for 5 hours and then concentrated to about two-thirds of the original volume. The precipitate was collected and recrystallized from benzene; yield 3.54 g (20.0 percent) of the imidazoline hydroiodide; mp 129.0°–131.0° C. dec.

Anal. for C₁₆H₃₁N₅:
| | | | | |
|---|---|---|---|---|
| Calcd: | C 45.61 | H 7.65 | I 30.12 | N 16.62 |
| Found: | C 45.47 | H 7.72 | I 30.12 | N 16.87 |

EXAMPLE 21

2-(Cyclopropylamino)-1-(2-imidazolin-2-yl)-2-imidazoline hydroiodide

A solution of cyclopropylamine (2.86 g, 0.0500 mol), triethyl[1-(2-imidazolin-2-yl)-2-imidazolin-2-yl]ammonium iodide hydroiodide methanethiol (27.1 g, 0.0500 mol) and freshly distilled (from calcium hydride) 2-propanol (250 ml) was refluxed for 1 hour while a slow stream of nitrogen was bubbled through the solution. The reaction mixture was allowed to cool to room temperature. The precipitate was collected and recrystallized from 95 percent 2-propanol-water; yield 6.13 g (39.0 percent) of the imidazoline hydroiodide, mp 264.0°–266.0° C. dec.

Anal. for C₉H₁₆IN₅:
| | | | | |
|---|---|---|---|---|
| Calcd: | C 33.66 | H 5.02 | I 39.51 | N 21.81 |
| Found: | C 33.80 | H 5.17 | I 39.39 | N 21.80 |

We claim:

1. A compound of the formula:

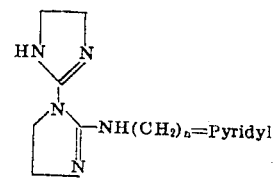

—NH(CH₂)ₙ=Pyridyl wherein N is 0,1,2 or 3.

2. A compound according to claim 1 which is 1-(2-imidazolin-2-yl)-2-{[2-(2-pyridyl)ethyl]amino}-2-imidazoline.

3. A compound according to claim 1 which is 2-({[1-(2-imidazolin-2-yl)-2-imidazolin-2-yl]amino}methyl)-pyridine.

* * * * *